(12) United States Patent
Pierce et al.

(10) Patent No.: US 9,302,543 B1
(45) Date of Patent: Apr. 5, 2016

(54) TIRE AND WHEEL LIFT

(71) Applicant: Quality Stainless Products, Inc., Hazelwood, MO (US)

(72) Inventors: Peter J. Pierce, Chesterfield, MO (US); Paul J. Altnether, St. Louis, MO (US)

(73) Assignee: Quality Stainless Products, Inc.

( * ) Notice: Subject to any disclaimer, the term of this patent is extended or adjusted under 35 U.S.C. 154(b) by 70 days.

(21) Appl. No.: 14/231,082

(22) Filed: Mar. 31, 2014

(51) Int. Cl.
*B60B 30/10* (2006.01)

(52) U.S. Cl.
CPC ............. *B60B 30/10* (2013.01); *B60B 2340/70* (2013.01)

(58) Field of Classification Search
CPC ............ B60B 30/10; B60B 30/02; B66F 9/18
USPC .......... 414/427; 187/231, 234, 237, 244, 224, 187/253
See application file for complete search history.

(56) References Cited

U.S. PATENT DOCUMENTS

| | | | |
|---|---|---|---|
| 1,361,909 A | 12/1920 | Schoenknecht | |
| 2,455,432 A | 12/1948 | Martin | |
| 2,883,003 A | 4/1959 | Arnot | |
| 2,977,092 A | 3/1961 | Duerksen | |
| 3,016,973 A * | 1/1962 | Williamson | B66F 9/07572 180/13 |
| 3,042,149 A * | 7/1962 | Comfort | B66F 9/08 187/226 |
| 3,050,153 A * | 8/1962 | Molis | B66F 9/06 180/13 |
| 3,195,751 A | 7/1965 | Meyers et al. | |
| 3,727,781 A | 4/1973 | Ramsey | |
| 3,830,342 A | 8/1974 | Allen | |
| 3,957,137 A | 5/1976 | Vermette | |
| 4,051,970 A | 10/1977 | Ramsey | |
| 4,131,181 A | 12/1978 | Vermette | |
| 4,310,072 A | 1/1982 | Davis | |
| 4,374,550 A | 2/1983 | Bartow | |
| 4,458,785 A | 7/1984 | Bushnell | |
| 4,496,031 A | 1/1985 | Allen et al. | |
| 4,571,142 A | 2/1986 | Niewald | |
| 4,593,791 A | 6/1986 | Matthews | |
| 4,684,310 A | 8/1987 | Stange | |
| 5,184,930 A | 2/1993 | Kuhn | |
| 5,330,032 A | 7/1994 | Warner | |
| 5,362,194 A | 11/1994 | Kassebaum | |
| 5,505,578 A | 4/1996 | Fuller | |
| 5,820,330 A | 10/1998 | Focke et al. | |
| 6,343,674 B1 | 2/2002 | Sexsmith | |
| 6,929,442 B2 * | 8/2005 | Ferrari | B66F 9/04 414/426 |
| 7,478,704 B2 | 1/2009 | Church | |
| 7,611,126 B2 | 11/2009 | Vesa | |
| 8,376,089 B2 * | 2/2013 | Stone | B66F 9/06 180/19.2 |
| 8,434,598 B2 * | 5/2013 | Simpson | B66F 9/08 187/230 |
| 8,684,654 B2 * | 4/2014 | Bardin | B60B 30/02 187/231 |
| 8,833,523 B2 * | 9/2014 | Simpson | B66F 9/08 182/141 |
| 2002/0164238 A1 * | 11/2002 | Ferrari | B66F 9/04 414/427 |
| 2003/0221914 A1 | 12/2003 | Smith | |
| 2009/0045015 A1 | 2/2009 | Anstead | |
| 2011/0206487 A1 | 8/2011 | Morgan | |
| 2011/0243696 A1 | 10/2011 | DiBenedetto | |

* cited by examiner

*Primary Examiner* — Kaitlin Joerger
(74) *Attorney, Agent, or Firm* — Grace J. Fishel

(57) ABSTRACT

A trolley for use in a cable lift having a mast with a generally rectangular hollow cavity forming a track in which the trolley may be reciprocated upwardly and downwardly. The trolley is connected to a cradle outside the mast upon which an object to be lifted may be placed. The trolley has trolley wheels which make rolling contact with a front and back side of the track to resist a forward bending moment in down direction on the cradle. The trolley has spacer wheels which make rolling contact with a right and left sides of the track to resist a lateral bending moment on the cradle such that the cradle may be mounted on the mast offset from centerline.

14 Claims, 6 Drawing Sheets

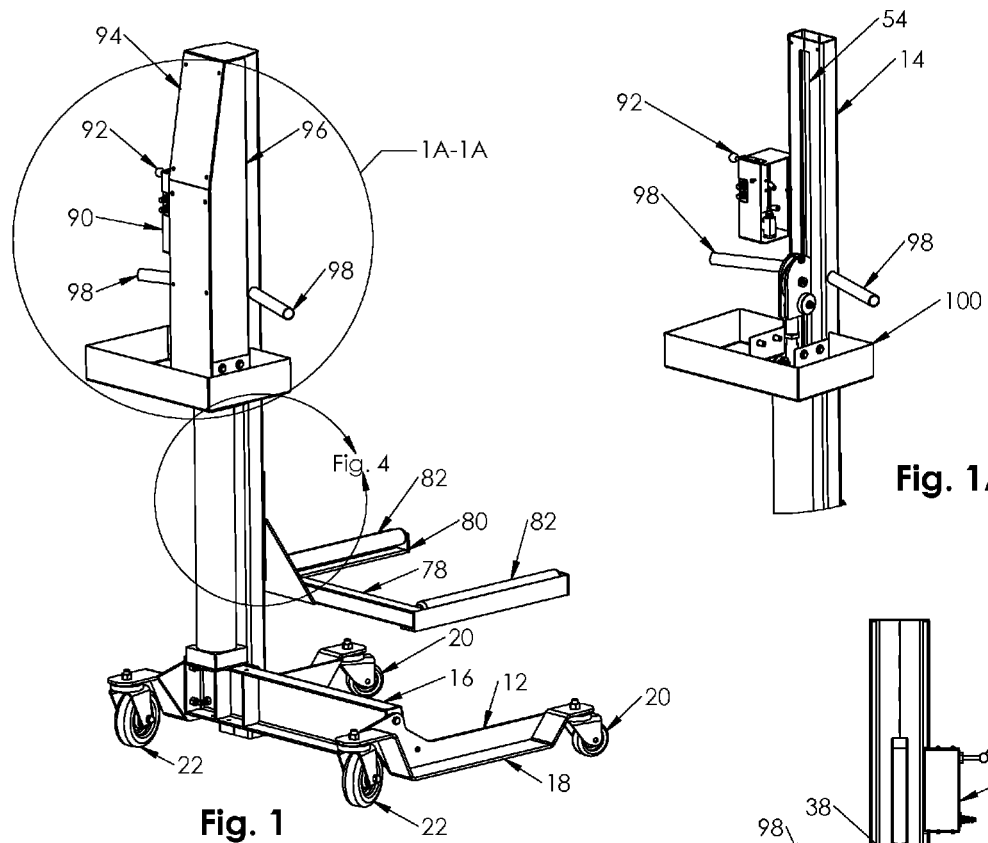
Fig. 1
Fig. 1A
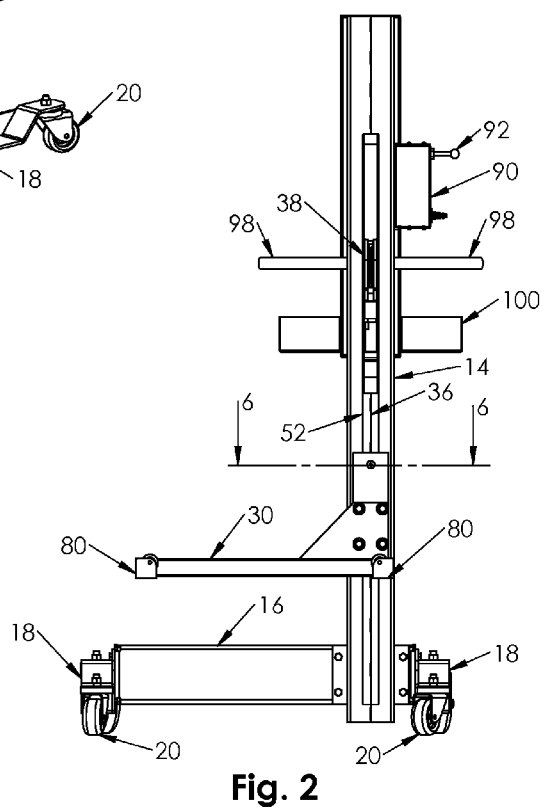
Fig. 2

TIRE AND WHEEL LIFT

BACKGROUND OF THE INVENTION

1. Field of the Invention

The present invention relates to a pneumatic tire and wheel lift wherein the mast is offset from the lifting forks for full access to lug nuts and easy and quick use with a wheel balancer or tire changer, for example. The invention further relates to a trolley for use with the tire and wheel lift as well as other cable lifts.

2. Brief Description of the Prior Art

Removal of a tire/wheel combination for repair from a passenger car, light/medium duty truck and SUV usually occurs after the vehicle has been raised several feet off the ground by a vehicle lift. Although raising the vehicle may provide better access to the vehicle during many maintenance procedures, manual removal of a tire/wheel combination exceeding fifty pounds or more may result in back injury, particularly with repetitive lifting of such tire/wheel combinations as will occur in shop. Employers and employees are concerned about this exposure to shoulder and back injury.

U.S. Pat. No. 8,684,654 to Quality Stainless Steel Products, Inc. describes a pneumatic tire and wheel lift which is suitable for both small and large tire/wheel combinations. As shown in the drawings, the mast is centered between the forks. For use with smaller tire/wheel combinations, it would be desirable if the mast were offset from centerline of the lifting forks for better access to the tire/wheel combination but this produces a lateral twisting moment which must be resisted for the tire and wheel lift to work smoothly.

BRIEF SUMMARY OF THE INVENTION

In view of the above, it is an object of the present invention to provide a trolley for use in a lift that can be used when a mast is offset from centerline of the cradle to resist a lateral bending moment. It is another object to provide a trolley that resists a forward bending moment on the cradle in down direction. Other objects and features of the invention will be in part apparent and in part pointed out hereinafter.

In accordance with the invention, a trolley is provided for reciprocation upwardly and downwardly in a track having a generally rectangular hollow cavity with a front side with a vertical slot, a rear side, a right side and a left side. The trolley has a generally elongated platform with a longer axis and an attachment point for a lifting cable at an upper end. The trolley is reachable through the vertical slot in the track for attachment of a lifting cradle. The trolley also has a front face and a rear face with upper and lower trolley wheels mounted on wheel axles on the rear face transverse the longer axis. The upper and lower trolley wheels are in rolling contact with the front and rear sides of the track for resisting a forward bending moment in a down direction on the cradle. Upper and lower spacer wheels are mounted on spacer axles perpendicular to a bottom face of the platform inboard of the wheel axles. The upper and lower spacer wheels are in rolling contact with the right and left sides of the track for resisting a lateral bending moment on the cradle when the cradle is mounted off centerline of the track.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 1 is a rear view of a tire and wheel lift in accordance with the present invention;

FIG. 1A is a view taken along line 1A-1A in FIG. 1 with a cover removed;

FIG. 2 is a front elevation of the lift;

DETAILED DESCRIPTION OF THE INVENTION

Figure 3:
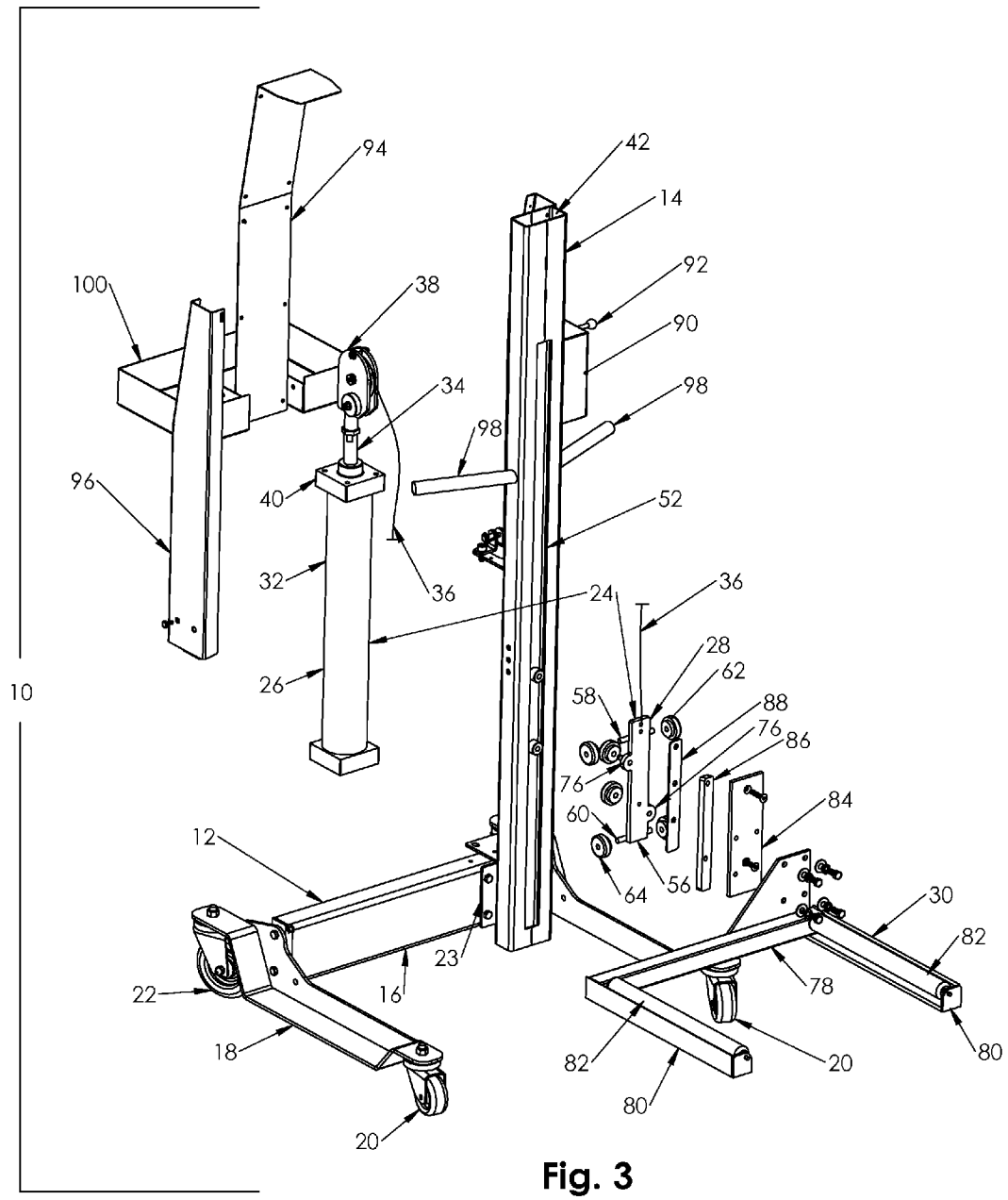
FIG. 3 is a front exploded perspective view of the lift.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawings, the tire/wheel lift 10 as described herein is suitable for lifting tire/wheel combinations to approximately chest height quickly and safely and in a manner that access to the lug nuts is not blocked. Lifting force may be provided by a conventional compressed air system typically available in automotive garages and the like. As shown, lift 10 has a support frame which includes a base 12 and a mast 14 fixed to base 12 and extending upwardly therefrom. Base 12 generally includes a horizontal beam 16 from which two rails 18 extend at opposite ends of beam 16 parallel and spaced apart from one another. A castor wheel 20 is swivel mounted at the free end of rails 18 spaced from beam 16. Swivel wheels 22 are mounted at respective ends of beam 16 and are larger in diameter than castor wheels 20. Beam 16 and both rails 18 lie in a generally horizontal plane when castor wheels 20 and swivel wheels 22 are supported for rolling movement across a shop floor. Mast 14 is supported at one end of beam 16 inboard left rail 18 (as viewed by an operator at the rear of lift 10) with a bracket 23 but could be centered between rails 18 or mounted inboard the right rail 18. Mast 14 is a tubular, hollow elongated member of rectangular cross section.

A lifting assembly 24 including a lifting device 26 and a trolley 28 is attached to a cradle 30 for lifting a tire/wheel combination or other object. As illustrated, lifting device 26 is a double acting air cylinder 32, the base of which is attached to beam 16 and which has a piston rod 32 generally parallel to mast 14. A cable 36 is passed around a sheave 38 mounted on the end of piston rod 34. One end of cable 36 is attached to a top 40 of double acting air cylinder 32 and another end is attached to trolley 28 which runs in a track 42 provided inside mast 14 as more particularly described below. It is apparent that the difference of movement between trolley 28 and rod 34 is by a ratio of 2:1. That is to say, for every increment rod 34 is extended, trolley 28 moves upwardly or downwardly by two increments. In the present embodiment, this specifically means that for every one inch increment of rod 34 movement upwardly or downwardly, the trolley moves two inches upwardly or downwardly. As a result lifting device 26 provides quick positioning and repositioning of trolley 28. It will be appreciated by those skilled in the art that other types of cylinders may be used in place of double action air cylinder 32. For example, the fluid may be oil and lifting device 26 may be a double acting hydraulic cylinder. In yet other embodiments, lifting device 26 may be an electric motor.

Figure 4:
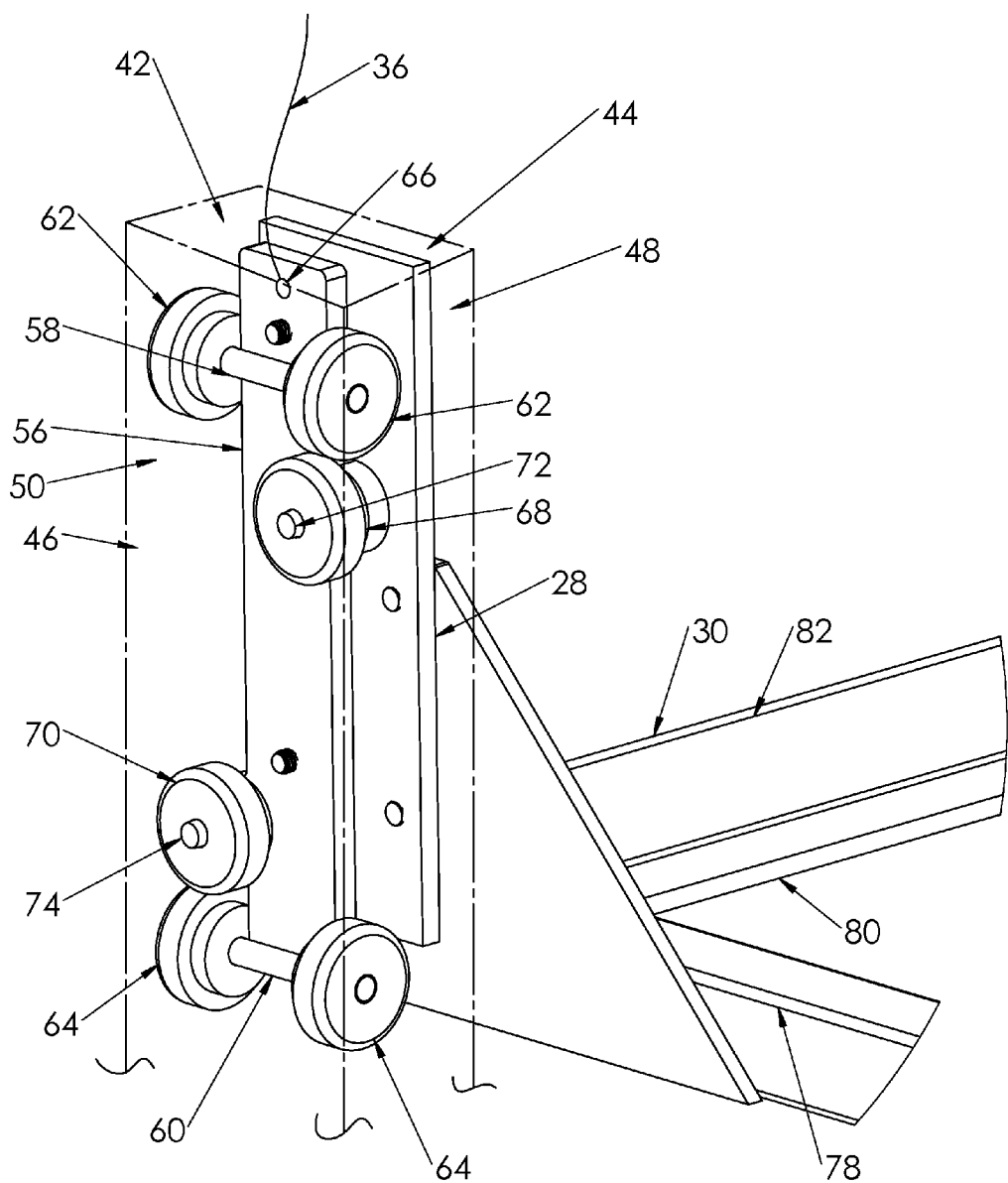
FIG. 4 is a detail on an enlarge scale taken along the line 4-4 in FIG. 1.
Figure 6:
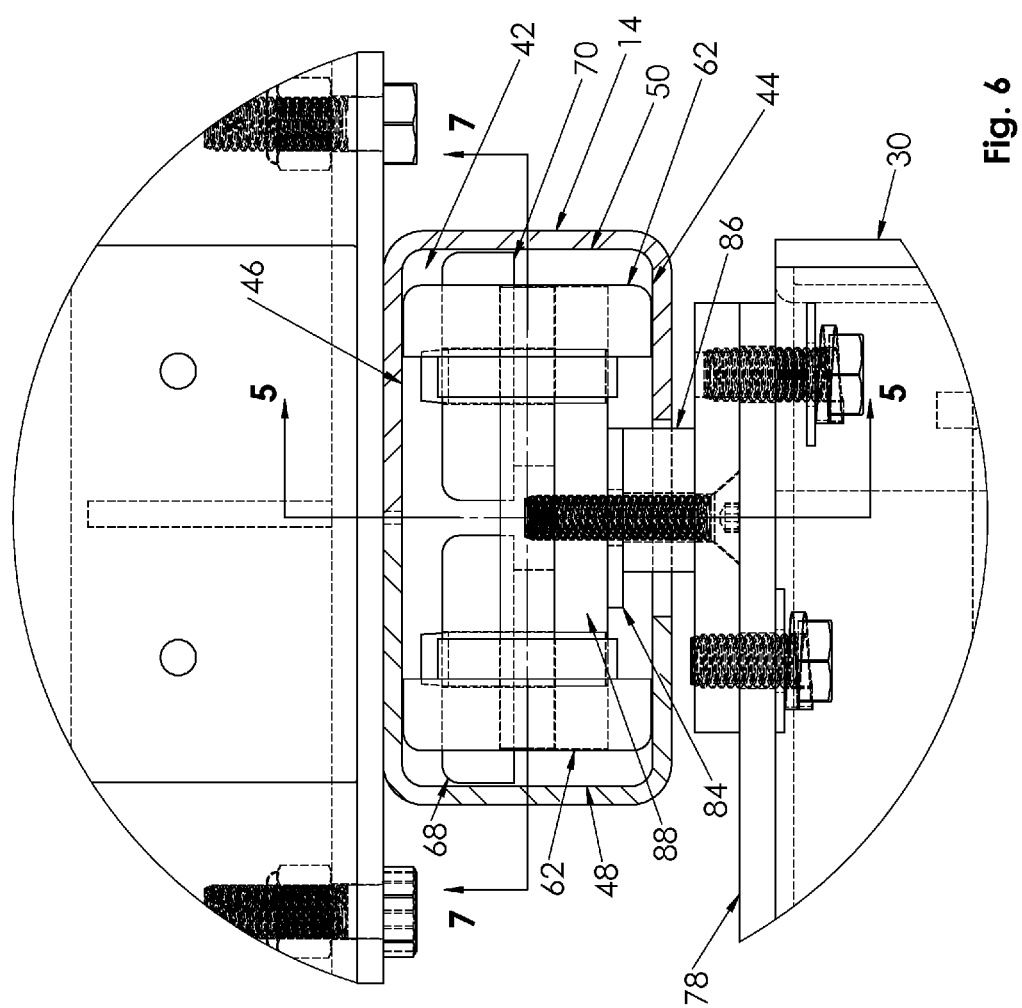
FIG. 6 is a cross-section taken along the plane 6-6 in FIG. 2.

Track 42 comprises the generally rectangular hollow cavity in mast 14. As best seen in FIGS. 4 and 6, the inside of mast 14 includes a front side 44, a back side 46 and right and left sides 48 and 50, respectively, as viewed by an operator at the back of lift 10. Mast 14 has a vertical front slot 52 running substantially the length of a front face and a shorter vertical rear slot 54 running along the upper part of a rear face, said slots 52, 54 in alignment. A portion of sheave 38 is received in shorter slot 54 for positioning cable 36 inside mast 14 for attachment to trolley 28.

Figure 5:
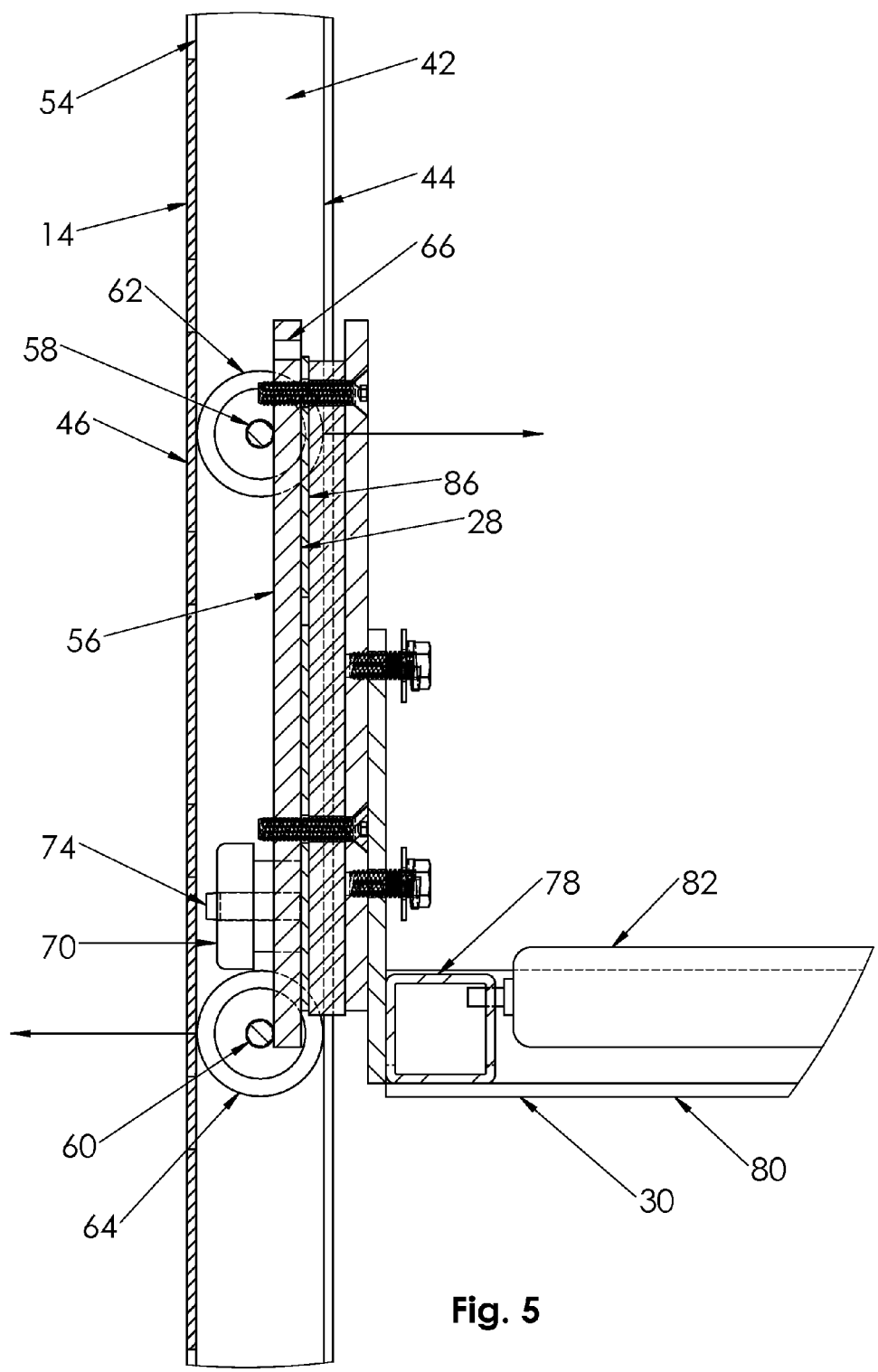
FIG. 5 is a cross-section taken along the plane 5-5 in FIG. 6.

Trolley 28 is generally an elongated platform 56 with an upper side and a under side. A pair of rods 58, 60 are mounted transverse the long axis of trolley 28 and proximate the upper and lower end. Upper trolley wheels 62 and lower trolley wheels 64 are mounted on rods 58, 60, respectively, which form axles about which wheels 62, 64 may rotate as well as slide. Trolley wheels 62, 64 make contact with front 44 and back 46 side of track 42 as best seen in FIG. 5. Inward movement of trolley wheels 62, 64 is stopped by contact with platform 56 such that rods 58, 60 do not overextend an outside face of trolley wheels 62, 64 and drag along right and left sides 48, 50 of track 42. An attachment point 66 (FIGS. 4 and 5) for cable 36 is provided on trolley 28 at an upper end of platform 56 between upper trolley wheels 62.

Spacer wheels 68, 70 are mounted on the under side of trolley inboard of rods 58, 60 on axles 72, 74 perpendicular to elongated platform 56. Spacer wheels 68, 70 like trolley wheels 62, 64, are free to slide as well as rotate on axles 72, 74 such that an outer face of spacer wheels 68, 70 may touch back side 46 of track 42 but there is no load on them. Spacer wheels 68, 70 make contact with right and left sides 48, 50 of track 42. To this end, lobes 76 (FIG. 1) may be provided on elongated platform 56 for attaching axles 72, 74. The same end could be accomplished with larger diameter spacer wheels 68, 70 but for manufacturing efficiency it may preferred to have interchangeably sized spacer 68, 70 and trolley wheels 62, 64.

Cradle 30 comprises a back frame 78 to which a pair of lifting forks 80 are attached. Tire rollers 82 may be rotatably attached to lifting forks 80 in a manner that allows the rollers to rotate in a clockwise or counterclockwise direction. It is understood that in other embodiments, tire rollers 82 may be replaced with other devices that may be necessary for manipulation of a tire/wheel combination, or in applications that require movement of objects other than tire/wheel combinations.

Cradle 30 is attached to trolley 28 through plates 84, 86 and 88 (FIGS. 3 and 6). Plate 86 serves as spacer such that plate 88 attached to trolley 28 is on the inside of mast 14 while plate 84 attached is on the outside of mast 14. Spacer plate 86 is sized such that it slides easily in front slot 52 and such that plates 84 and 88 do not contact the inside or outside of mast 14.

The movement of trolley 28 and thus cradle 30 is controlled by a lift control 90 for coupling lifting device 26 to a source of power such as a source of compressed gas. A control switch 92 may be provided on lift control 90 and in an embodiment, compressed air is supplied to lift 10 with a quick disconnect fitting disposed on lift control 90. Use of a quick disconnect fitting enhances the general portability of lift 10 by allowing the lift to be connected to any available compressed air source without requiring a dedicated air tank mounted on the lift. In an embodiment, the control switch 92 may be a four-way, three position fluid control switch in which a first position communicates a flow of fluid to lifting device 26 to extend rod 34. A second position communicates a flow of fluid to lifting device 26 to retract rod 34 into the lifting device. Finally, a third position is a neutral position that does not communicate any flow of fluid to lifting device 26 and, therefore, retains the vertical location of trolley 28 in track 42. By manipulating the position of control switch 92, the operator controls the upward movement, the downward movement and the static position of the cradle 30 and that allows the operator to position the tire/wheel combination at whatever location that allows the operator to dismount or mount the combination with least effort and without back and shoulder strain.

To protect the components of lifting device 26, lift 10 may include a back cover 94 and two side covers 96. The two side covers 96 are attached to mast 14 and the back cover 94 is then attached to the two side covers 96. As a result the operator is shielded from the moving components of lifting assembly 24. Handles 98 are coupled to the side of mast 14 and extend laterally outwardly at a slight rearward and downward incline. Handles 98 are fixed relative to mast 14, spaced above base 12, and permit manual positioning of lift 10 on wheels 20, 22 relative to the ground when grasped by the operator. Mast 14 may also include a tool tray 100 for an air driven impact gun, tire inflation chuck, lug nuts associated with the particular wheel/tire combination being worked on or other appropriate tools for the particular job.

In operation, an operator positions tire/wheel lift 10 on caster and swivel wheels 20, 22 with handles 98 such that cradle 30 faces the tire/wheel combination to be removed from a vehicle with the vertical centerline of cradle 30 in general alignment with the center line of the wheel/tire combination on the vehicle and with mast 14 offset. Compressed air is supplied to the lift 10 by attaching available compressed air to the quick disconnect fitting on lift control 90. Control switch 92 is activated to allow the lift 10 to move cradle 30 upward (or downward as necessary) until tire rollers 82 on lifting forks 80 are at an elevation just below the bottom circumference of the tire/wheel combination on the vehicle. The operator releases control switch 92 to allow the control switch to return to a neutral position which holds cradle 30 at a fixed height. The operator pushes lift 10 toward tire/wheel combination until tire rollers 82 are beneath the tire/wheel combination.

Using proper tools, the operator then removes each of the lug nuts holding the tire/wheel combination on the vehicle and can optionally place the lug nuts in tool tray 100 mounted on mast 14. After all lug nuts are removed, the operator pulls tire/wheel combination from the vehicle and allows the wheel assembly to rest upon the tire rollers 82 of cradle 30. Lift 10 may then be moved away from the vehicle until tire/wheel combination can be lowered without interference. The operator then activates the control switch 92 to lower cradle 30. When cradle 30 is low enough to allow the tire/wheel combination to be safely rolled off cradle 30, the operator releases the control switch 92 to allow the control switch to return to a neutral position which holds cradle 30 at a fixed height.

When the operator is ready to install the tire/wheel combination back onto the vehicle, the previous procedure is generally reversed. During reinstallation, tire rollers 82 allow the operator to rotate the tire/wheel combination after it has been positioned in general vertical alignment with the hub of the vehicle upon which the wheel is being mounted. This allows the operator to easily align the tire/wheel mounting fasteners with the tire/wheel openings without having to manually lift the weight of the tire/wheel combination. Those of skill in the art will appreciate that lift 10 greatly reduces the dead weight that must be lifted, carried, and positioned by the operator during dismounting and remounting of the tire/wheel combination to the vehicle and thus reduces the likelihood of back and shoulder injury.

By positioning mast 14 offset from centerline of cradle 30, an operator may reach the lug nuts and manipulate the tire/wheel combination more easily than when the mast is on centerline. But positioning mast 14 offset from centerline of cradle 30 results in a lateral bending moment in addition to a forward bending moment which is also present when the mast is on centerline. Trolley 28 as described above facilitates smooth operation of lift 10 in both cases. More particularly, as cradle 30 is loaded with tire/wheel combination, there is a forward bending moment on forks 80 in down direction. As shown in FIG. 5, this is resisted by top set of trolley wheels 62 which press more firmly against the inside of front side 44 of track 42 while the lower set are pressed more firmly against the inside of back side 46 of track 42. For improved safety, the amount of "fork tips down" movement may be reduced by increasing the spacing between the upper and lower trolley wheels 62, 64, which is a first advantage provided by trolley 28 as described above.

Figure 7:
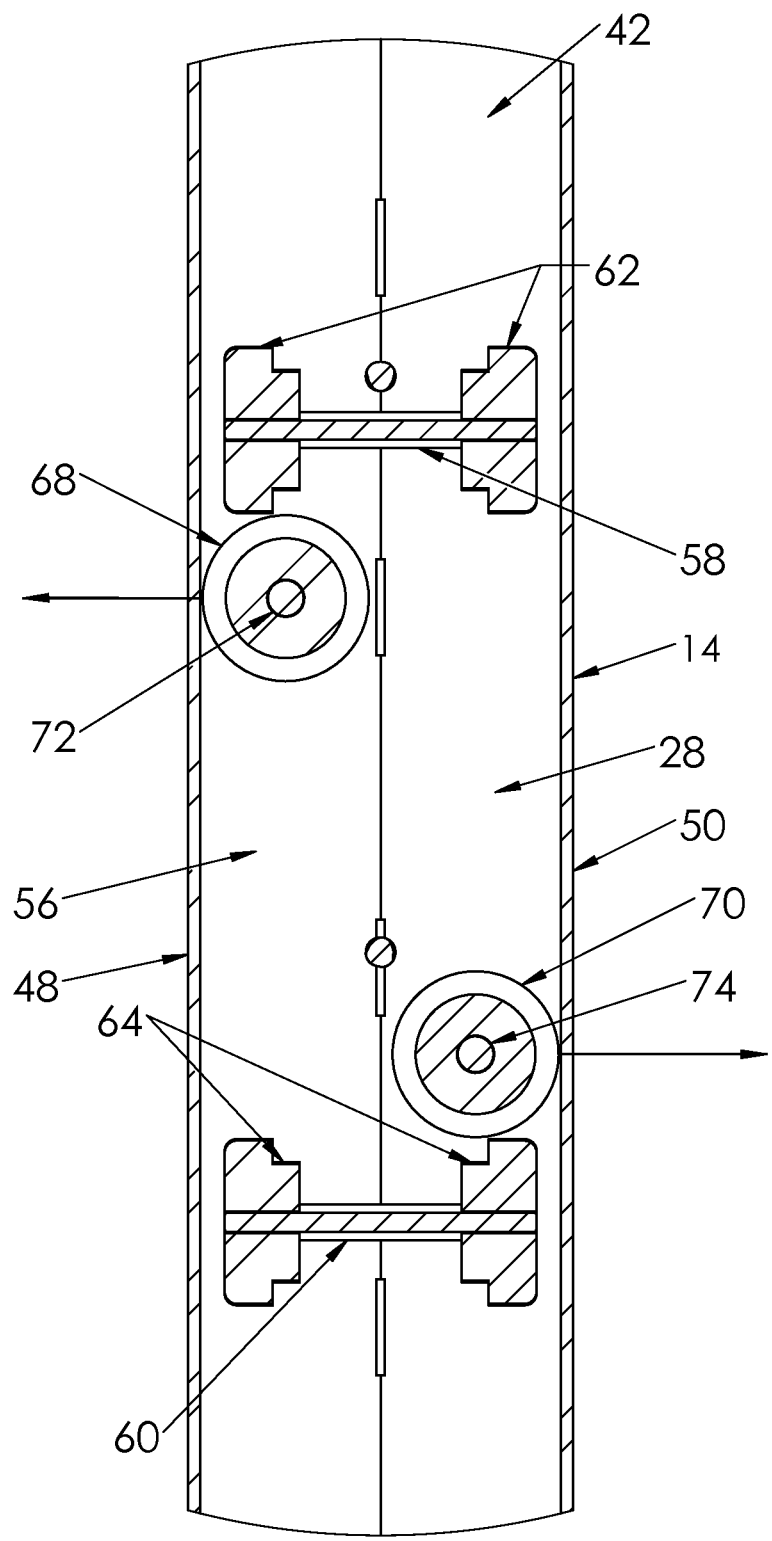
FIG. 7 is a cross-section taken along the plane 7-7 in FIG. 6.

There is also a lateral bending moment applied to trolley 28 when lifting forks 80 are offset from centerline of mast 14. This force is resisted by spacer wheels 68. 70. As shown in FIG. 7, the upper of which is pressed more firmly against the inside of right side 48 (as viewed by the operator) of track 42 and the lower of which is pressed more firmly against the inside of left side 50 of track 42. The amount of lateral bending may be reduced by increasing the spacing between spacers 68, 70 thus further facilitating smooth operation of lift 10, a second advantage provided by trolley 28.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill Hence as various changes could be made in the above constructions without departing from the scope of the invention, it is intended that all matter contained in the above description or shown in the accompanying drawings shall be interpreted as illustrative and not in a limiting sense.

What is claimed:

1. A trolley for reciprocation upwardly and downwardly in a track having a generally rectangular hollow cavity with smooth inner walls, said track having a front side with a vertical slot, a rear side, a right side and a left side, said trolley comprising a generally elongated platform having a longer axis and having an attachment point for a lifting cable at an upper end, said trolley having a front face and a rear face with upper and lower trolley wheels mounted on wheel axles on the rear face transverse the longer axis, said upper and lower trolley wheels in rolling contact with the front and rear smooth inner walls of the track, upper and lower spacer wheels mounted on spacer axles perpendicular to a bottom face of the platform inboard of the wheel axles, said upper and lower spacer wheels in rolling contact with the right and left smooth inner walls of the track, said trolley reachable through the vertical slot in the track for attachment of a lifting cradle.

2. The trolley of claim 1 wherein the platform has lobes upon which the spacer axles are mounted whereby the trolley wheels and spacer wheels are the same size.

3. The trolley of claim 1 wherein a spacer plate is attached to the trolley and the lifting cradle, said spacer plate sized such the spacer plate slides easily in the vertical slot in the slot with the trolley inside the track and the lifting cradle outside the track.

4. A tire/wheel lift comprising:
a cradle capable of lifting an object mounted off centerline on a hollow generally rectangular mast with front and rear aligned slots and smooth inner walls comprising a lifting track;
a trolley operatively connected to the cradle;
said trolley having an underside mounted for reciprocation up and down the lifting track on two pairs of trolley wheels that are attached to the underside of the trolley and are designed, sized and configured to engage with portions of the smooth inner walls of the lifting track to guide the trolley upwardly and downwardly within the lifting track; said trolley further having two spacer wheels mounted on the underside of the trolley inboard of the trolley wheels, said spacer wheels designed, sized and configured to engage with portions of the smooth inner walls of the lifting track not engaged by the trolley wheels,
said cradle comprising a frame, two tire rollers, and a mounting bracket by which it is attached to an upper side of trolley outside the front slot, wherein each of the two tire rollers is rotatably attached in a manner that allows the tire rollers to rotate in a clockwise or counterclockwise direction;
a cable lifting assembly operatively connected to the trolley through the rear slot wherein the lifting assembly includes a lifting device that moves the trolley at a ratio of about 2:1 such that the trolley moves about two increments for every one increment the lifting device moves;
said cable lifting assembly having a single point attachment to the trolley at an upper end between an upper of the two pairs of wheels;
said trolley suspended by the cable lifting assembly in the lifting track.

5. The tire/wheel lift of claim 4 wherein the lifting device is double acting and includes a fluid chamber at each end of the lifting device that can be pressurized and depressurized to accomplish the raising or the lowering of the cradle.

6. The tire/wheel lift of claim 5 wherein the lifting device further comprises a rod that generates a linear action in the lifting device when the fluid chambers in the lifting device are pressurized and depressurized.

7. The tire/wheel lift of claim 6 further comprising a sheave assembly mounted onto the rod of the lifting device.

8. The tire/wheel lift of claim 7 further comprising a cable that is installed into the lifting assembly by attachment of a first end of the cable to the lifting device and attachment of a second end of the cable to the trolley with an intermediate portion of the cable passed over the sheave.

9. The tire/wheel lift of claim 8 wherein the lifting device is fluid operated and is controlled by a control switch that is four-way fluid control switch having at least three control positions that can operatively bias the trolley at least one of either upward, downward, or to remain in a fixed position.

10. The tire/wheel lift of claim 1 wherein the cable lifting assembly is one of either pneumatic, hydraulic, or electrical.

11. A lift comprising:
   a cradle capable of lifting an object mounted off centerline on a hollow generally rectangular mast with front and rear aligned slots and smooth inner walls comprising a lifting track wherein the cradle is mounted onto a trolley having an underside with two pairs of trolley wheels that are designed, sized, and configured to engage with portions of the smooth inner walls of the lifting track to guide the trolley upwardly and downwardly within the lifting track, said trolley further having two spacer wheels mounted on the underside of the trolley inboard of the trolley wheels, said spacer wheels designed, sized and configured to engage with portions of the smooth inner walls of the lifting track not engaged by the trolley wheels, and a spacer plate attached to an underside of the trolley and extending outside the front slot for attachment of the cradle,
   a cable lifting assembly operatively connected to the trolley through the rear slot with single point attachment to the trolley at an upper end between an upper of the two pairs of trolley wheels, said trolley suspended by the cable lifting assembly in the lifting track, wherein the cable lifting device is a double-acting cylinder that can be pressurized and depressurized to accomplish the raising or the lowering of the cradle.

12. The lift of claim 11 further comprising a sheave mounted onto a cylinder rod of the lifting device.

13. The lift of claim 12 further comprising a cable with a first end attached to the cylinder and a second end to the single point attachment to the trolley, and an intermediate portion of the cable passed over the sheave.

14. The lift of claim 11 wherein the trolley has lobes upon which the spacer wheels are mounted whereby the trolley wheels and spacer wheels are the same size.

* * * * *